Figure 1:
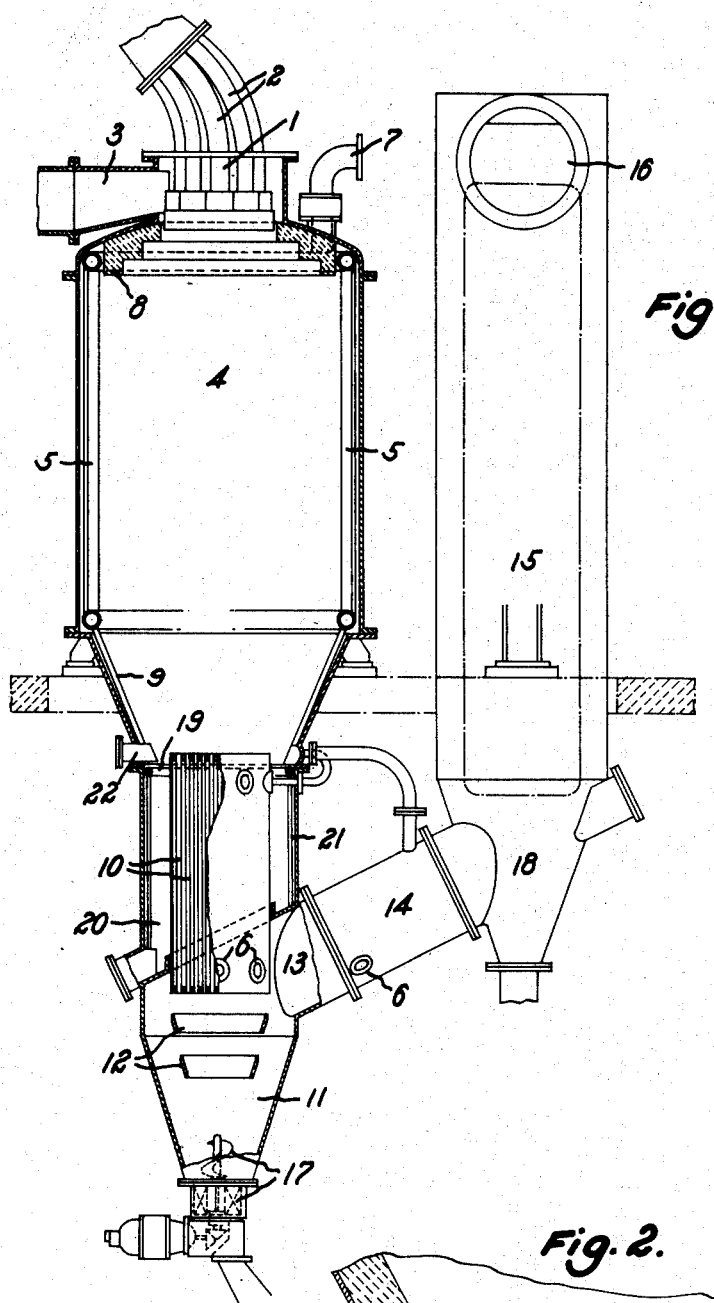

May 7, 1946.   W. G. NOACK   2,399,884
APPARATUS FOR REMOVING SLAG FROM FURNACES
Filed May 28, 1943

Inventor:
Walter Gustav Noack,
by Pierce & Scheffler
Attorneys.

Patented May 7, 1946

2,399,884

UNITED STATES PATENT OFFICE 2,399,884

APPARATUS FOR REMOVING SLAG FROM FURNACES

Walter Gustav Noack, Baden, Switzerland, assignor to Aktiengesellschaft Brown, Boveri & Cie, Baden, Switzerland Application May 28, 1943, Serial No. 488,949
In Switzerland April 16, 1942

3 Claims. (Cl. 110—28)

With the usual furnaces in which fuels are employed which form slag, for instance coal dust, it is the rule that the fuel should be burnt as completely as possible in the combustion chamber and the heating gases cooled in the latter to such an extent that the ash particles carried away by the heating gas stream become solidified before they reach the heating gas flues and thus cannot adhere to the walls. The main part of the ash or slag should not reach the heating gas flues at all, but be separated out in the combustion chamber and removed from this latter either in the liquid state or through granular screens in a solid condition.

With pressure fired combustion chambers these operating conditions cannot generally be realized. With pressure firing it is of primary importance that full use should be made of the possibility of obtaining maximum combustion chamber loading. Heat transfer rates of 150,000 to 250,000 kcal./h and cubic metre of combustion chamber space, such as are usual with ordinary pulverised coal firing, are not sufficient and the load is increased up to more than thirty times this amount. The result is that the radiation heating surfaces inside the combustion chamber are no longer by any means adequate for the extraction of so much heat from the heating gases inside the combustion chamber that their temperature drops to the temperature at which the slag solidifies.

The extraordinarily high heat transfer obtained with pressure firing is not merely due to the higher pressure but rather more the result of the powerful turbulence caused in the fuel-air mixture, for which purpose a considerable portion of the available pressure drop can be utilised. The result of this turbulence is that with pressure firing the slag particles do not drop out, such as for instance is the case in the large combustion chambers of an ordinary pulverized coal fired furnace, but are whirled up again and again and mostly remain suspended in the heating gases.

With pressure firing it must therefore be taken into account that large quantities of slag are removed with the heating gases and this slag is still in the liquid or plastic state when it reaches the heating surfaces. The probability that the heating surfaces which are located beyond the combustion chamber will very soon become choked with slag is therefore very great.

Tests have shown, however, that heating surfaces can be kept free from slag if they are kept sufficiently cool and smooth, if all resistance points where the slag drops can collect are avoided, and finally if the heating gases are caused to flow past the heating surfaces at a high velocity, that is to say if the heating surfaces consist of surfaces which have no bends in the direction of flow and are subjected to a high velocity parallel stream of heating gas. The flow of heating gas can be conducted in a horizontal or downward direction, if only the heating gas velocity is high enough to keep the drops of slag in suspension and carry them away.

The present invention makes use of these observations in order to remove the slag from furnaces, particularly pressure-fired furnaces and to preserve the smoke gas flues and heating surfaces from the effects of the slag. The invention concerns a method of removing slag from furnaces, particularly pressure-fired furnaces employing fuels which readily produce slag, whereby the main portion of the slag is carried along by the main portion of the heating gases produced in the combustion chamber and is driven through a heat exchanger which forms the main part of the heating surfaces serving to absorb the heat from the heating gases. The heat exchanger is preferably connected to the lowest point of the combustion chamber and so dimensioned that in it the heating gases are cooled to a temperature which is in the proximity of the solidifying temperature of the slag. The velocity at which the heating gases flow through the channels is selected so high, at least 100 metres/sec., that due to the blast effect of the gas the channels are automatically cleaned.

Figure 2:
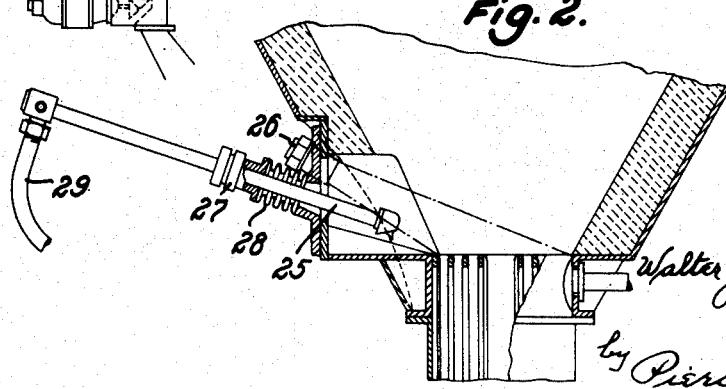

Two constructional examples of the invention are illustrated diagrammatically in the accompanying drawing in connection with the application of the invention to a pressure-fired steam generator (Velox boiler). Fig. 1 shows a sectional view through a pressure-fired combustion chamber together with the adjoining heat exchanger, while Fig. 2 shows a sectional view of the lower part of such a combustion chamber to a larger scale.

In Fig. 1 the reference numeral 1 indicates the pulverized coal burner. It receives the fuel together with the primary air through a number of tubes 2, while the secondary air which is supplied by a combustion air blower not shown in the drawing enters through a tube 3. 4 is the combustion chamber which is lined with tubes 5 through which circulating water flows which enters at 6 and leaves the combustion chamber together with the steam at 7. Reference numeral 8 indicates a radiation element of refractory stone for the stabilization of the flame. The conical end piece 9 of the combustion chamber can consist of cooled metal casings or also be lined with fire-proof bricks. In any case a temperature is maintained inside the combustion chamber which even at partial loads lies above the melting point of the slag.

According to the invention the entire or at least the major part of the slag which is still in the liquid state is carried along by the heating gas and removed through the vertical first contact heating surfaces 10 and passed downwards, the slag drops being cooled, solidified and expelled from the lower part of the slag receiver 11. The heating gases themselves are diverted at a moderate velocity by the elements 12 and at 13 enter the second stage of the evaporator heating surfaces 14 where they are cooled down to the temperature necessary for steam superheating. 15 is the superheater. At 16 the heating gases leave the superheater and pass for instance to a gas turbine which drives the charging blower for the combustion air.

The slag which has become cooled between the evaporator heating surfaces 10 and is forced at high speed through the tubes emerges from these latter mostly as a fine powder. This can then easily be removed by means of a suitable device such as a worm wheel and a cell runner 17. The portion which is blown upwards is transported by the heating gases through the heat exchanger 14 to the ash catcher 18 where it is separated from the air or removed in a special ash separator which is located directly in front of the gas turbine.

The slag which runs down from the walls of the combustion chamber can also be removed separately from the slag which is carried along by the heating gases. Thus for instance a gap 19 can be left free around the heat exchanger through which this slag passes into the slag catcher 20. The walls surrounding this space are lined either with evaporator tubes 21 or firebricks, depending upon the temperature which it is desired to maintain there.

Of all the surfaces with which the liquid or semi-liquid slag comes in contact, only the end surface at the inlet side of the heat exchanger 10 offers a surface where the slag impinges and can adhere.

It is, however, impossible for large layers of slag to form there because this end surface is subjected to the full radiation effect with its great penetration so that the temperature is so high that the slag remains liquid and flows away of its own accord. Nevertheless in order to be able to help with external means, the space in the immediate vicinity of the end surface of the heat exchanger is made readily accessible by means of an opening 22. Fig. 2 shows for instance a scraping device 25 by means of which any slag deposit can be removed. The same device can also contain a steam, air or water jet blower by means of which the slag is blasted away. A peep hole 26 enables the cleaning operation to be supervised. The tool 25 consists of a rod or tube which due to the gland 27 and the diaphragm tube 28 can be freely moved. Steam, air or water is supplied through the pipe 29.

The scraping device can also be constructed for automatic operation and it is also possible to arrange for the steam or air jet to come into operation automatically at certain intervals for the purpose of cleaning the end surface. The small extent of the surfaces from which slag may have to be removed can be judged by the fact that the total area of the heat exchanger end surface, even with steam generators for about 100 tons/h evaporation output, is less than ¾ of a square metre and more than half of this surface has to be deducted for the gas channel bores. To facilitate cleaning it is advisable to arrange the channel inlet openings as close as possible to each other and in a single plane.

The method described can also be used for other purposes besides the removal of slag from steam generating plants. It can for instance be used in connection with the combustion chamber for a gas turbine operating with pulverized coal, where for the removal and cooling of the slag a heat exchanger is employed which serves either to generate auxiliary steam or as an air preheater. The air which is to be preheated can be cooling air which is mixed with the heating gases, or it can be combustion air whose preheating temperature should be increased in accordance with the extent to which it is desired to increase the loading of the combustion chamber. The method of slag removal according to the invention can be employed with all firing systems where there is an adequate pressure drop available to impart a high velocity to the heating gases and where furthermore sufficient heat can be extracted to solidify the slag.

I claim:

1. In combination, a combustion chamber, means for introducing a combustible mixture comprising a fusible ash producing pulverized fuel adjacent one end of said combustion chamber, a heat exchanger having one end connected to the other end of said combustion chamber, a slag collecting chamber connected to the other end of said heat exchanger, means operatively associated with said slag collecting chamber for discharging slag therefrom, said combustion chamber and heat exchanger providing a substantially straight path for the products of combustion formed in the combustion chamber, and substantially rectilinear heat exchange surfaces in said heat exchanger extending longitudinally of said path.

2. The combination as defined in claim 1 in which the combustion chamber is substantially cylindrical with its axis vertically disposed, the heat exchanger comprises a cylindrical outer wall with its axis vertically disposed and the heat exchange surfaces are provided by a substantially cylindrical bundle of tubes through which the products of combustion pass, said bundle of tubes being separated from the outer wall of the heat exchanger by an annular space for the passage of liquid slag flowing down the wall of the combustion chamber.

3. In combination, a substantially cylindrical vertically disposed combustion chamber, a substantially cylindrical vertically disposed heat exchange chamber connected to the lower end of the combustion chamber, means for introducing a combustible mixture comprising a slag producing finely divided fuel downwardly into the upper end of the combustion chamber, a bundle of substantially straight vertically disposed heat exchange tubes in said heat exchange chamber, an ash collecting chamber positioned below and communicating with said tubes, an annular space between said bundle of tubes and the wall of said heat exchange chamber, and means closing said annular space adjacent the lower end thereof for collecting and discharging fluid slag.

WALTER GUSTAV NOACK.